(12) United States Patent
Johnson et al.

(10) Patent No.: US 11,258,985 B2
(45) Date of Patent: Feb. 22, 2022

(54) TARGET TRACKING IN A MULTI-CAMERA SURVEILLANCE SYSTEM

(71) Applicant: Verint Americas Inc., Alpharetta, GA (US)

(72) Inventors: Alexander Steven Johnson, Erie, CO (US); Nir Naor, Ramat Hasharon (IL); Yaron Ostrovsky-Berman, Petach Tikva (IL); Zvi Figov, Maccabim Re'ut (IL)

(73) Assignee: VERINT SYSTEMS INC., Melville, NY (US)

( * ) Notice: Subject to any disclaimer, the term of this patent is extended or adjusted under 35 U.S.C. 154(b) by 136 days.

(21) Appl. No.: 15/477,294

(22) Filed: Apr. 3, 2017

(65) Prior Publication Data

US 2017/0289505 A1  Oct. 5, 2017

Related U.S. Application Data

(60) Provisional application No. 62/318,517, filed on Apr. 5, 2016.

(51) Int. Cl.
*H04N 7/18* (2006.01)
*G06T 7/292* (2017.01)
(Continued)

(52) U.S. Cl.
CPC ............ *H04N 7/181* (2013.01); *G06T 7/292* (2017.01); *G11B 27/105* (2013.01); *G11B 27/28* (2013.01);
(Continued)

(58) Field of Classification Search
CPC .................. H04N 7/181; G06T 7/292; G06T 2207/30241; G06T 2207/30232; G06T 2207/30196; G06T 2207/10016; G06T 2200/24; G06T 2207/10024; G11B 27/28; G11B 27/105
See application file for complete search history.

(56) References Cited

U.S. PATENT DOCUMENTS

| 7,171,625 B1 * | 1/2007 | Sacchi ................. G06F 3/0481 345/157 |
| 2002/0016971 A1 * | 2/2002 | Berezowski ..... G08B 13/19693 725/105 |

(Continued)

*Primary Examiner* — Joseph G Ustaris
*Assistant Examiner* — Jill D Sechser
(74) *Attorney, Agent, or Firm* — Meunier Carlin & Curfman LLC

(57) ABSTRACT

Tracking of targets in video captured by a multi-camera surveillance system is often difficult due to incomplete camera coverage and due to the complexities associated with automated recognition in a dense and highly variable environment. The present disclosure embraces a system and method for target tracking in a multi-camera surveillance system that reduces the time required for a user to track a target by offering computer generated search results that include suggestions of candidates found in the video that match (to some degree) the target. When one of the candidates is selected by a user, the search is shifted to other cameras and continued. In this way, the target may be tracked quickly. Further, a playlist of video snippets of the target is accumulated during the search and can be played to show all captured video of the target moving about the facility.

19 Claims, 10 Drawing Sheets

(51) Int. Cl.
*G11B 27/10* (2006.01)
*G11B 27/28* (2006.01)
(52) U.S. Cl.
CPC .................. *G06T 2200/24* (2013.01); *G06T 2207/10016* (2013.01); *G06T 2207/10024* (2013.01); *G06T 2207/30196* (2013.01); *G06T 2207/30232* (2013.01); *G06T 2207/30241* (2013.01)

(56) References Cited

U.S. PATENT DOCUMENTS

| | | | | |
|---|---|---|---|---|
| 2007/0127774 A1* | 6/2007 | Zhang | ................ | G06K 9/00771 |
| | | | | 382/103 |
| 2008/0292140 A1* | 11/2008 | Morris | ............... | G06K 9/00295 |
| | | | | 382/103 |
| 2010/0166260 A1* | 7/2010 | Huang | ................ | G06K 9/3241 |
| | | | | 382/103 |
| 2012/0206605 A1* | 8/2012 | Buehler | ........... | G08B 13/19645 |
| | | | | 348/159 |
| 2014/0211019 A1* | 7/2014 | Choi | ..................... | H04N 7/181 |
| | | | | 348/159 |
| 2016/0313440 A1* | 10/2016 | Burton | ................. | G01S 13/588 |
| 2018/0033153 A1* | 2/2018 | Hirasawa | ................ | G06K 9/00 |

* cited by examiner

TARGET TRACKING IN A MULTI-CAMERA SURVEILLANCE SYSTEM

CROSS-REFERENCE TO PRIORITY APPLICATION

This application claims the benefit of U.S. provisional patent application No. 62/318,517 filed on Apr. 5, 2016, which is hereby incorporated by reference in its entirety.

FIELD OF THE INVENTION

The present invention relates to multi-camera video systems for safety/security and more specifically, to a system and method for the tracking of targets from camera-to-camera.

BACKGROUND

Safety and security is made easier through the use of camera networks. These networks use a plurality of cameras that are installed throughout a facility/location (e.g., an office building, mall, airport, parking lot, etc.). The installed cameras allow the activity occurring in various areas to be viewed by a person (or persons) in a central location (or locations).

Historically, security cameras were located only in high-traffic or high-value areas (e.g., entrances/exits, store checkouts, etc.). As cameras have become less expensive and as safety/security has become more important, camera networks have been expanded, using more cameras to cover more areas. The result is much more video delivered to the central location for analysis. To cope with the overwhelming amount of visual information, viewing tools have been created to allow users (e.g., security personnel) to manage and view video from each camera. These viewing tools may also use automation (e.g., video analysis, recognition, etc.) to help automatically detect targets/events in a video for viewing. Despite these advances some deficiencies remain. For example, even extensive camera networks still may not provide complete coverage. Indeed, it is common for a facility to only have 20% or less of its area viewed by the facility's installed cameras, making tracking targets between these cameras difficult. For example, a target (e.g., a person) moving through the field of view of one camera may reappear in the field of view of one of several other cameras at any later time. To make matters worse, the target may be moving about in a crowded environment. Alone and without any automation, a user would have to monitor many cameras simultaneously to locate the person (sometimes in a crowd) that has left one camera's field of view to determine when and where the person reappears.

While automated target recognition solutions exists, the problem described is too complex to be effective without a human. A need therefore exists for an interactive graphical user interface (GUI) that helps a user find and track a target. In addition, a need exists for a system that allows the user to combine snippets of video of the target from various cameras into a playlist that follows the target along the target's path through the facility. Such a solution would allow for fast tracking in real-time and also allow for efficient analysis of recordings that are analyzed later.

SUMMARY

Accordingly, in one aspect, the present invention embraces a multi-camera surveillance system. Multiple cameras are placed throughout a facility (e.g., airport, shopping mall, etc.) or location (e.g., parking lot, park, etc.). The cameras are positioned and aligned to capture video of different areas (e.g., areas with no overlap, areas that partially overlap, etc.). The cameras are communicatively coupled (e.g., wired connection, wireless connection, etc.) to a central computing device. The central computing device may record the video and/or present the video on a display. Software running on the computing device allows a user to interact with the video and the cameras via a graphical user interface (i.e., GUI). In one possible embodiment, the GUI allows a user to track a target in real time. In another possible embodiment, the GUI allows a user to track a target using recorded video.

The GUI may display video from a primary camera (e.g., real-time video or recorded video) in a primary video tile in the GUI. In addition, video from a group of secondary cameras may be displayed in secondary video tiles. The secondary cameras may be selected automatically based on a likelihood of a target subsequently appearing in the secondary camera's area after first appearing in the primary video. In one possible embodiment, the likelihood is based on heuristics (e.g., results of previous searches, results of previous user interaction, etc.). In another possible embodiment the likelihood is based on the position of the secondary cameras with respect to the primary camera (e.g., within a specified range, proximate to, along a route in a facility, etc.).

As mentioned, the GUI allows for a target to be tracked. In one possible embodiment, a target may be tracked using the GUI as follows.

A user makes a primary camera selection, wherein the primary camera selection designates one camera from a plurality of cameras as primary. Next, software running on the computing device automatically selects, based on the primary camera selection, secondary cameras that view areas different from primary camera. The GUI then displays the primary video from the primary camera and secondary video from the secondary cameras. A user may generate a target sample from a portion of the primary video, thereby adding the target sample to a target-sample set. Video from the secondary cameras is then searched (e.g., for an adjustable time period) for the target using the target samples in the target sample set. Candidate samples are created as a result of the search. Candidate samples are portions of video from the secondary cameras that are similar to the target-sample set (i.e., match one or more attributes in the target-sample set). The candidate samples are presented (e.g., as images) to a user in the graphical user interface. A user may review the candidate samples and when the user has decided that the target is present, the candidate sample may be selected, thereby creating a new target sample from the selected candidate sample. The selection also automatically updates the primary camera and the secondary cameras based on the camera that created candidate sample. For example, the camera that captured the selected candidate sample will be assigned as the primary camera. In addition, the secondary cameras will be changed to correspond with the newly assigned primary camera. The new target sample is added to the target-sample set and the search continues. That is, video from the new secondary cameras is searched using the target samples in the updated target-sample set. This process repeats. In one possible embodiment, the process repeats until a target cannot be found in the candidate samples.

In an exemplary embodiment, a video playlist of video corresponding to the target-sample set is created and arranged in chronological order.

In another exemplary embodiment, a track of the target is creating using geographic locations of cameras and the times video of the target was obtained.

In another exemplary embodiment, the secondary cameras are cameras proximate to or within a range from the primary camera. For example, proximate cameras are cameras with adjacent fields of view.

In another exemplary embodiment, the secondary cameras are along a route (e.g., a hallway) including the primary camera.

In another exemplary embodiment, the secondary cameras are chosen based on a likelihood determined by previous tracking. For example, previous tracking results that most targets move from a first camera to a second camera.

In another exemplary embodiment, the secondary cameras are chosen based on previous candidate sample selections. For example, a user has historically chosen a particular secondary camera more than other secondary cameras when tracking a target's movement.

In another exemplary embodiment, the tiles displaying video from the secondary cameras is arranged according to likelihood or proximity.

In another exemplary embodiment, a user may select a candidate sample in the GUI to provide additional associated information. For example, additional associated information may include an indication of the secondary camera that created the candidate sample, a geographic location of candidate sample, a larger and/or improved resolution view of the candidate sample (i.e., as compared to the view initially presented), and/or a time the candidate sample was created.

In another exemplary embodiment, the searching the secondary video for candidate samples proceeds for an adjustable period.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1A:
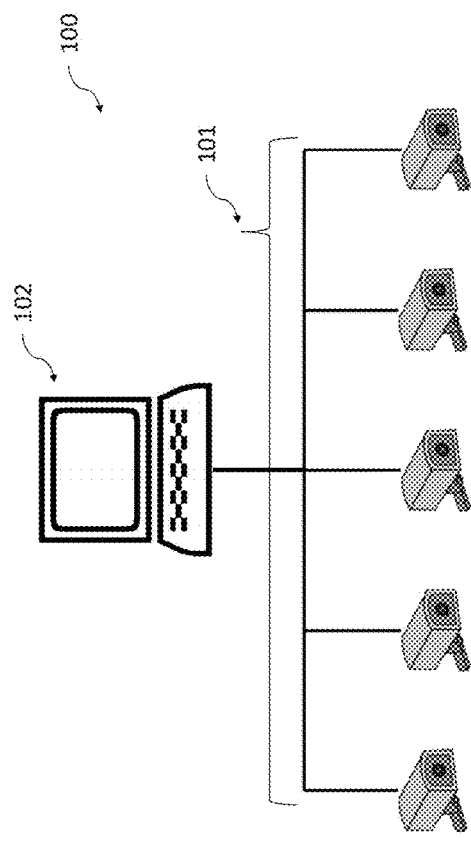
FIG. 1A schematically depicts a multi-camera surveillance system according to an exemplary embodiment of the present invention.

FIG. 1A depicts a multi-camera surveillance system 100. As shown, a plurality of cameras 101 connected to a central computing device 102. The connection may occur over a network or each camera may be directly connected to the computing device. The cameras are typically installed in a fixed location and point at a particular area. In some cases, however, the cameras may be adjustable (e.g., pan, tilt, and zoom). The cameras may include illumination (e.g., IR illumination) for nighttime viewing. The cameras 101 may be identified electronically by the geographic area in which they are installed or view. The identification may help to correlate the location of a target observed in video with a particular geographic location.

Figure 1B:
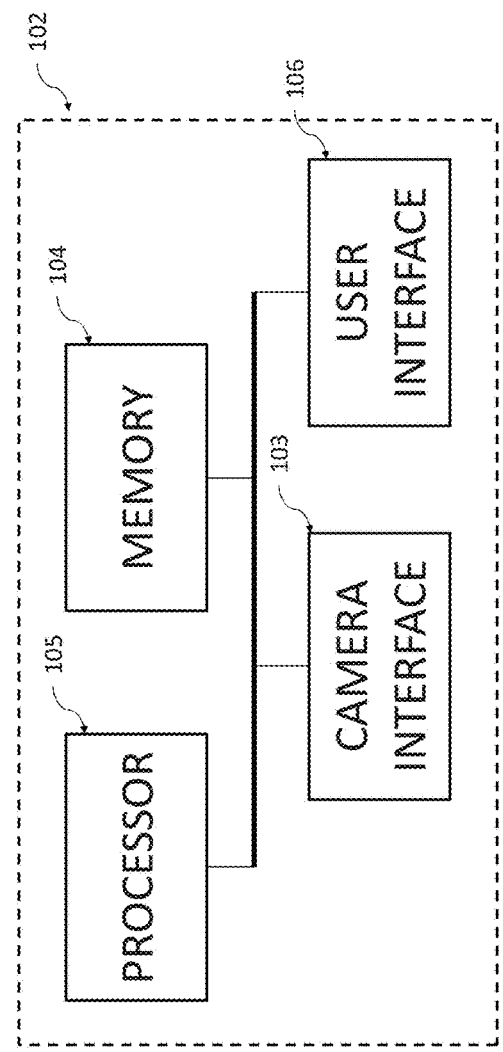
FIG. 1B schematically depicts a computing device capable of interacting with cameras and running a graphical user interface for tracking a target according to an exemplary embodiment of the present invention.

FIG. 1B schematically depicts an exemplary central computing device 102 for the multi-camera surveillance system 100. The central computing device includes a camera interface 103 for sending and receiving signals (e.g. video signals, control signals, etc.) to/from the cameras 101. The computing device 102 also includes a memory 104 (e.g., hard drive, array of hard drives, RAM, ROM, etc.) for recording/buffering video captured by the cameras 101 to the memory 104 and for running software (e.g., operating system, GUI, etc.) to interact with the recorded (or live) video and/or to control the cameras 101. The memory 104 may be integrated with the computing device or remote to the central computing device 102 and in communication with the central computing device (e.g., via the internet). The central computing device 102 also includes a processor 105 (e.g., CPU, FPGA, ASIC, controller, etc.) to perform the functions necessary for recording video and operating the GUI. The computing device also includes a user interface 106 to send and receive information to/from a user (e.g., via a display, keyboard, mouse, touchscreen, etc.). The processor may be configured by software to present a graphical user interface that allows a user to interact with video from the cameras either in real-time or from played back from memory. In response to this interaction the GUI and processor may perform a method for tracking a target throughout areas covered by the camera. The tracking is guided because it requires user input. This user-guided aspect of the tracking is fast and computationally efficient because the processor must only find candidates that are similar (i.e., match one or more attributes) to a target rather than matching the target with more precision (e.g., exactly matching the target).

Figure 2:
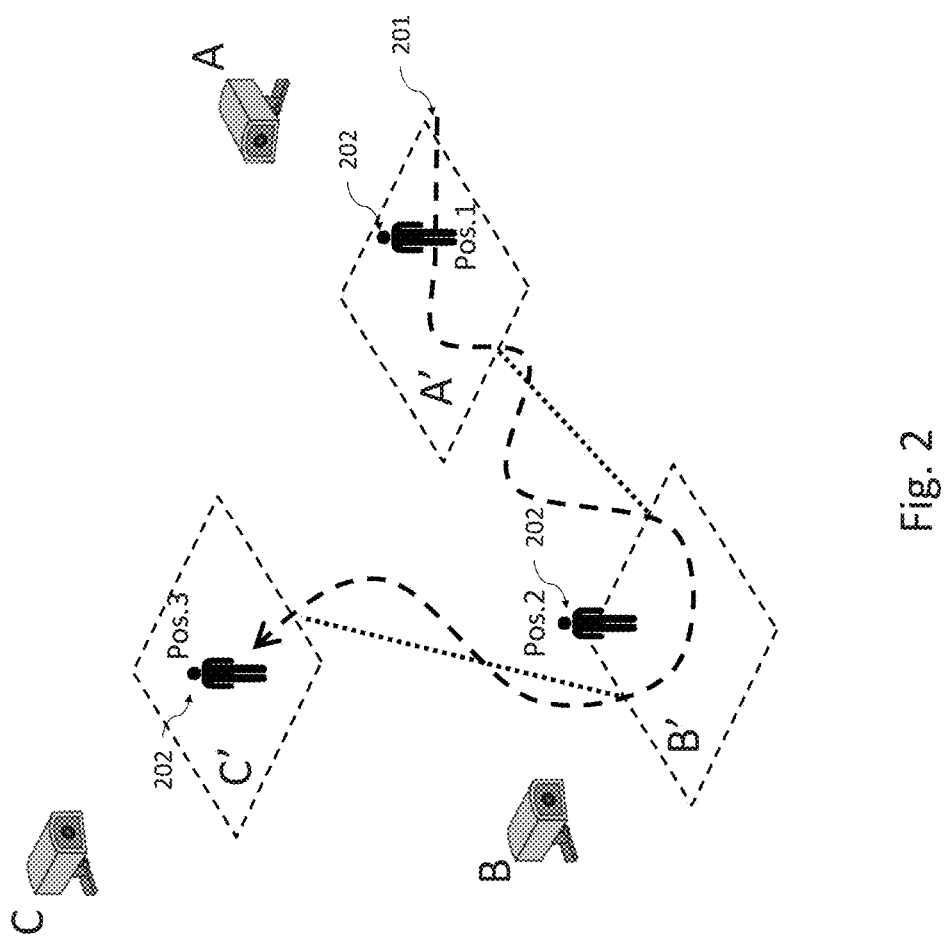
FIG. 2 graphically depicts a target's track through the areas viewed by cameras according to an exemplary implementation of the present invention.

FIG. 2 graphically depicts a track 201 of a target 202 through the areas viewed by three cameras (A,B,C) according to an exemplary implementation of the present invention. As shown, the target 202 takes a winding track (i.e., path, route, etc.) through three areas (A',B',C') covered by three different cameras (A,B,C). The target's track is known within the areas covered by the cameras but unknown between the areas covered by the cameras. The system and method disclosed may be used to reconstruct the unknown portions of a target's track (i.e., shown as dotted paths).

Figure 3:
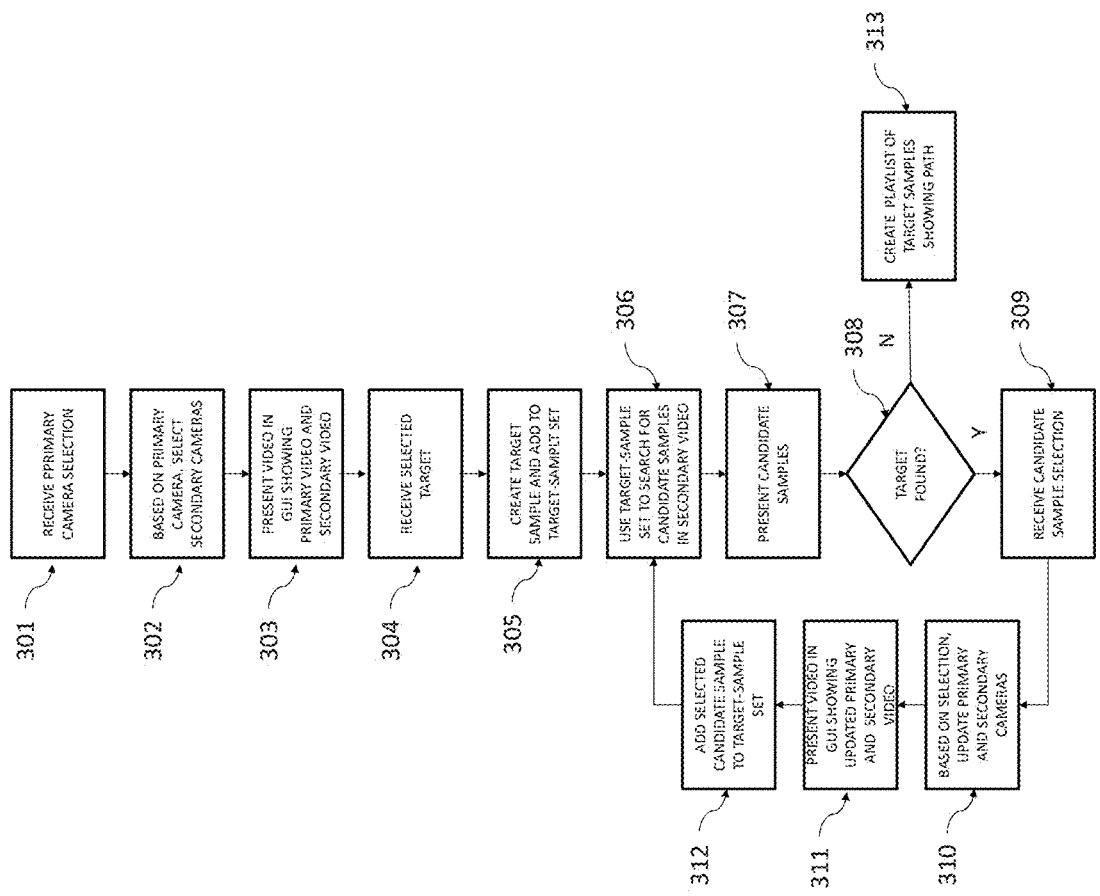
FIG. 3 is a flow chart depicting a method for guided tracking in a multi-camera surveillance system according to an exemplary embodiment of the present invention.

FIG. 3 is a flow chart depicting a method for guided tracking in a multi-camera surveillance system. To begin tracking, a user selects 301 a primary camera from the plurality of cameras. Next, based on the primary camera selection, secondary cameras are automatically selected 302. The secondary cameras view areas that are different from the primary camera and are provided because a moving target is likely to appear within the video from one of the secondary cameras after leaving the view of the primary camera. For example, secondary cameras may capture video from areas adjacent to the area imaged by the primary camera.

The primary video from the primary camera and secondary video from the secondary cameras are presented 303 in the GUI as viewing tiles (i.e., windows) and a user may search for a target within the video displayed. Once a target is observed, a user may use the GUI to select 304 a target sample from a portion of the primary video.

After the selection, the target sample is added to a target-sample set 305. Video from the secondary cameras is then searched for candidate samples that match the target samples in the target sample set 306. The searching typically uses recognition algorithms that compare one or more attributes in the target-sample set to video captured by the secondary cameras. The attributes may include (but are not limited to) color (e.g., hair color, skin color, clothing color, etc.), size (e.g., height), associated objects (e.g., backpack, luggage, etc.), or a face. The matching requirements are eased because candidate samples are presented to a user for a final determination.

The candidate samples are presented 307 (e.g., as images) to the user for review. The user reviews the candidate samples and determines 308 if any of the target samples matches the target. In making the determination, the user may select (e.g., by hovering over or clicking on) a candidate sample to provide additional information that may help the user determine a match. After determining that at least one of the candidate samples matches the target, the user selects 309 a matching candidate sample to continue the tracking.

The selection of the candidate sample adds 312 the candidate sample to the target-sample set, thereby creating an expanded target-sample set that may include additional attributes for matching. The selection also automatically updates 310 the primary camera by making the secondary camera that captured the candidate sample the primary camera. Based on the new primary camera, other secondary cameras are automatically selected using the same heuristics or rules as before (e.g., based on previously observed routes, based on proximity, etc.). The new secondary cameras may include one or more cameras from the old set of secondary cameras or may be a completely different set of secondary cameras.

Video from the new primary and new secondary cameras are presented 311 in the GUI and the tracking continues by searching the secondary video using the target samples in the expanded target-sample set. This process may continue until a target cannot be found in the candidate samples for an adjustable period.

During the search, a playlist of video corresponding to the target-sample set is created 313. Accordingly, the video of the target may be played in chronological order to observe the target moving through the area covered by the video cameras. In addition based on knowledge of the camera locations, a track of the user may be reconstructed.

Figure 4:
FIG. 4 graphically depicts a graphical user interface (GUI) for video tracking according to an exemplary embodiment of the present invention.

FIGS. 4-10 graphically illustrate screen shots from a GUI performing the method for guided tracking in a multi-camera surveillance system according to an implementation of the present disclosure. FIG. 4 graphically depicts a graphical user interface (GUI) after a user has selected a primary camera. The primary video tile is shown in the right half of the display and (in this case) seven secondary video tiles are shown in the left half of the display. The number of secondary video tiles may vary for different cameras. In addition, the secondary video tiles may be arrange in an order understood by a user. For example, the secondary video tiles may be arranged according to a likelihood that a user will appear in the video after leaving the primary video. A time line representing the displayed video is shown along the bottom of the display is.

Figure 5:
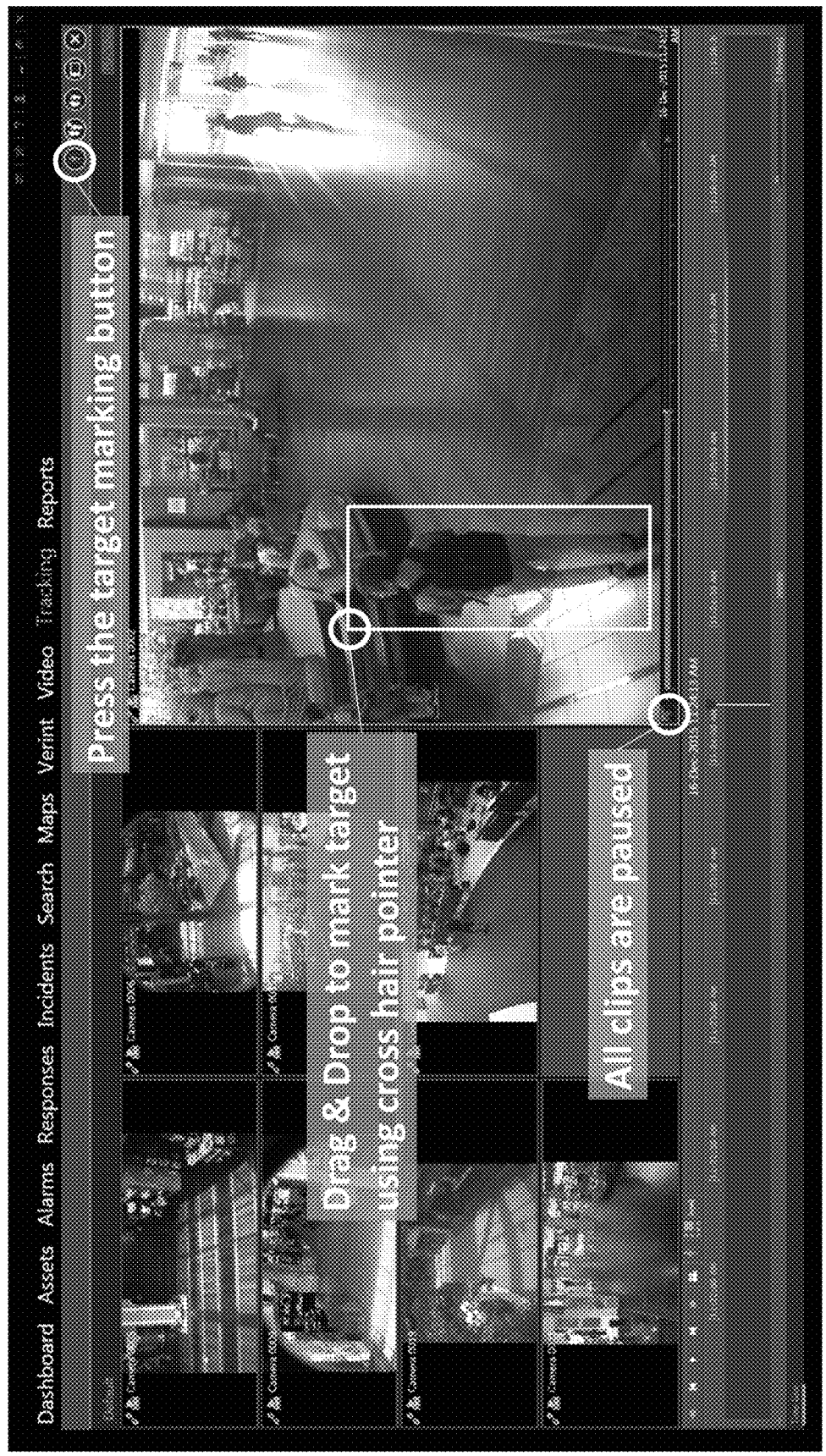
FIG. 5 graphically depicts selecting a portion of the primary video to generate a target sample using a GUI for video tracking according to an exemplary implementation of the present invention.

FIG. 5 graphically depicts how a user may select a portion of the primary video to generate a target sample. To select a target, a user presses a target-marking button (shown top right) and drag/drops a box (e.g., shown as a box around a person in the primary video tile). During this process, all clips may be paused.

Figure 6:
FIG. 6 graphically depicts adding a target sample to a target-sample set according to an exemplary embodiment of the present invention.

FIG. 6 graphically depicts the results of the target selection. A first target sample is created (e.g., image, video snippet, etc.) and is added to a target-sample set (shown along the bottom of the display).

Figure 7:
FIG. 7 graphically depicts searching the secondary video for candidate samples and presenting the candidate samples in a graphical user interface according to an exemplary implementation of the present invention.

FIG. 7 graphically depicts the result of adding a target sample. Based on the target sample, the central computing device searches the secondary video for matches to the first target sample using recognition algorithms. The search may proceed for an adjustable amount of time. Matches (i.e., search results) that meet criteria are presented along the bottom of the GUI as candidate samples. This collection of candidate samples is updated as the video timeline (i.e., video capture period) progresses.

Figure 8:
FIG. 8 graphically depicts interacting with candidate samples presented in a graphical user interface according to an exemplary implementation of the present invention.

A user may interact (e.g., hover a cursor over) any of the candidate samples at any time to obtain more information (e.g., camera, time, location) or to view the candidate sample better (e.g., larger, higher resolution, etc.). This interaction is illustrated in FIG. 8.

Figure 9:
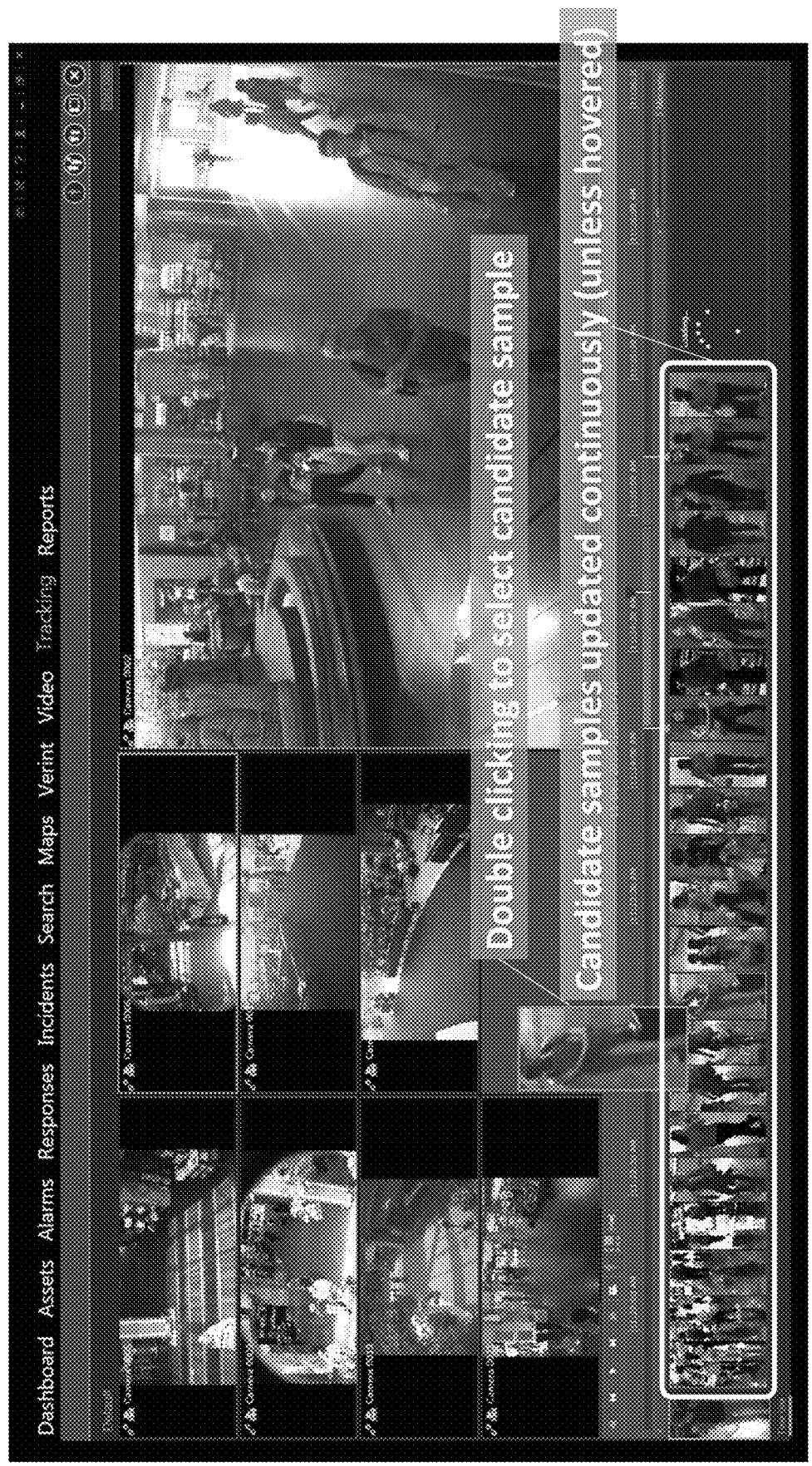
FIG. 9 graphically depicts creating a new target sample by selecting a candidate sample from candidate samples that are presented in a GUI according to an exemplary implementation of the present invention.

FIG. 9 illustrates a possible user interaction to make an identification. A user identifies one of the candidate samples as the target by selecting (e.g., double clicking) the particular candidate sample corresponding to the target.

Figure 10:
FIG. 10 graphically depicts (i) updating the primary camera and secondary cameras based on a selection of a candidate sample and (ii) adding the new target sample to the target-sample set according to an exemplary implementation of the present invention.

FIG. 10 illustrates possible results from selecting a candidate sample. The primary video tile is updated to display the camera that created the particular candidate sample (i.e., this camera view replaces the video previously shown primary video tile). The secondary video tiles are also updated to display the secondary cameras associated with the new primary camera. The video shown in the secondary video tiles is likely contain the target after the target moves out of the video shown in the primary video time.

The selected candidate sample is added to the target sample set (as shown along the bottom of the display) and a search of the secondary video for the expanded candidate sample set (i.e., two samples as shown) is restarted. The search interval (i.e., period) that the secondary video is search is also restarted. The secondary video is searched for the target using all of the target samples in the updated target sample set. One beneficial result of this approach is as the target is tracked, the searching (i.e., matching) may become more accurate because more target samples are available for comparison.

As shown in FIG. 10, the target samples may be presented in the GUI as images arranged chronologically. These images may correspond to video snippets of the target stored in memory. As a result, the target sample set may represent a play list of video snippets of the target moving about the facility (or area) in chronological order. Accordingly, the target may be tracked easily. In addition, a user may backtrack a target (i.e., track a target from the target's present location to a previous location) by accessing the video corresponding to the target samples in reverse chronological order.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for tracking a target in a multi-camera surveillance system, the method comprising:
receiving a primary camera selection, wherein the primary camera selection designates one camera from a plurality of cameras as primary;
assigning, based on the primary camera selection, secondary cameras that view areas different from primary camera;
receiving primary video from the primary camera and secondary video from the secondary cameras;
presenting the received primary video in a first window of a graphical user interface;
presenting the received secondary video in a second window of the graphical user interface;
upon observation of the target in displayed video by a user, selecting a portion of video as a target sample from a portion of the primary video, the target sample selected by the user;
adding the portion of video of the target sample to a target-sample set specific to the target;
presenting the target sample in a third window of the graphical user interface;
searching the secondary video for candidate samples based on the portions of video in the target sample set, wherein the candidate samples are portions of video from the secondary cameras;
presenting the portions of video of the candidate samples in the third window of the graphical user interface adjacent to the target sample;
upon determination by a user that at least one of the candidate samples includes the target, creating a new target sample from the at least one of the candidate samples, the at least one of the candidate samples associated with one of the secondary cameras;
automatically assigning the one of the secondary cameras as a new primary camera and automatically assigning, based on the one of the secondary cameras, new secondary cameras that view areas different from the one of the secondary cameras;
adding the new target sample to the target-sample set;
presenting the target samples of the target-sample set in the third window of the graphical user interface, wherein the target samples replace the portions of video of the candidate samples in the third window;
repeating the steps of searching, presenting, creating, updating, and adding until no candidate sample that includes the target is determined for a period;
obtaining geographic locations of cameras used to acquire the target samples in the target sample set;
obtaining times of the target samples in the target sample set; and
reconstructing, using the times and the geographic locations, a track of the target, wherein the track graphically depicts a path of the target through the geographical locations at the obtained times.

2. The method according to claim 1, further comprising:
creating a video playlist of video from the portions of video in the target sample set arranged in chronological order.

3. The method according to claim 1, wherein the primary video and the secondary video are live video and the tracking occurs in real time while the target is moving.

4. The method according to claim 1, wherein the primary video and the secondary video are recorded video and the tracking occurs after the target has moved.

5. The method according to claim 1, wherein the assigning, based on the primary camera selection, secondary cameras that view areas different from primary camera, comprises:
selecting cameras from the plurality of cameras that are proximate to the primary camera.

6. The method according to claim 1, wherein the assigning, based on the primary camera selection, secondary cameras that view areas different from primary camera, comprises:
selecting cameras that have a likelihood of viewing the target after the target leaves the area viewed by the primary camera.

7. The method according to claim 6, wherein the likelihood is determined by previous tracking.

8. The method according to claim 6, wherein the likelihood is determined by previous camera selection by a user.

9. The method according to claim 1, wherein the video from the secondary cameras are displayed in the second window of the graphical user interface according to the likelihood of the target appearing.

10. The method according to claim 1, wherein the assigning, based on the primary camera selection, secondary cameras that view areas different from primary camera is automatic.

11. The method according to claim 10, wherein the automatic selection uses heuristics based on previous searches.

12. The method according to claim 1, wherein the candidate samples provide associated information when selected.

13. The method according to claim 12, wherein the associated information comprises an indication of the camera that created a respective candidate sample.

14. The method according to claim 12, wherein the associated information comprises an indication of the time a respective candidate sample was created.

15. The method according to claim 12, wherein the associated information comprises a view of a respective candidate sample that is larger or higher resolution than provided initially.

16. The method according to claim 1, wherein the assigning, based on the primary camera selection, secondary cameras that view areas different from primary camera, comprises:
selecting cameras within a specified range from the primary camera.

17. The method according to claim 1, wherein the assigning, based on the primary camera selection, secondary cameras that view areas different from primary camera, comprises:
selecting cameras within along a route including the primary camera.

18. A multi-camera surveillance system, comprising:
a plurality of cameras that each capture video of different areas of a facility;
a central computing device communicatively coupled to the plurality of cameras, wherein the central computing device comprises a processor, the processor configured by software to:
receive a primary camera selection, wherein the primary camera selection designates one camera from a plurality of cameras as primary;
assign, based on the primary camera selection, secondary cameras that view areas different from primary camera;
receive primary video from the primary camera and secondary video from the secondary cameras;
present the received primary video in a first window of a graphical user interface;
present the received secondary video in a second window of the graphical user interface;
upon observation of the target in displayed video by a user, select a portion of video as a target sample from a portion of the primary video, the target sample selected by the user;
add the portion of video of the target sample to a target-sample set specific to the target;
present the target sample in a third window of the graphical user interface;
search the secondary video for candidate samples based on the portions of video in the target sample set, wherein the candidate samples are portions of video from the secondary;
present the portions of video of the candidate samples in the third window of the graphical user interface adjacent to the target sample;
upon determination by a user that at least one of the candidate samples includes the target, create a new target sample from the at least one of the candidate samples, the at least one of the candidate samples associated with one of the secondary cameras;
automatically assign the one of the secondary cameras as a new primary camera and automatically assigning, based on the one of the secondary cameras, new secondary cameras that view areas different from the one of the secondary cameras;
add the new target sample to the target-sample set;
present the target samples of the target-sample set in the third window of the graphical user interface, wherein the target samples replace the portions of video of the candidate samples in the third window;
repeat the steps of searching, presenting, creating, updating, and adding until no candidate sample is selected for a period;
obtain geographic locations of cameras used to acquire the target samples in the target sample set;
obtain times of the target samples in the target sample set; and
reconstruct, using the times and the geographic locations, a track of the target, wherein the track graphically depicts a path of the target through the geographical locations at the obtained times.

19. A non-transitory computer readable medium containing computer readable instructions that when executed by a processor of a computing device cause the computing device to perform a method comprising:
receiving a primary camera selection, wherein the primary camera selection designates one camera from a plurality of cameras as primary;
assigning, based on the primary camera selection, secondary cameras that view areas different from primary camera;
receiving primary video from the primary camera and secondary video from the secondary cameras;
presenting the received primary video in a first window of a graphical user interface;
presenting the received secondary video in a second window of the graphical user interface;
upon observation of the target in displayed video by a user, selecting a portion of video as a target sample from a portion of the primary video, the target sample selected by the user;
adding the portion of video of the target sample to a target-sample set;
presenting the target sample in a third window of the graphical user interface;
searching the secondary video for candidate samples based on the portions of video in the target sample set, wherein the candidate samples are portions of video from the secondary cameras;
presenting the portions of video of the candidate samples in the third window of the graphical user interface adjacent to the target sample;
upon determination by a user that at least one of the candidate samples includes the target, creating a new target sample from the at least one of the candidate samples, the at least one of the candidate samples associated with one of the secondary cameras;
automatically assigning the one of the secondary cameras as a new primary camera and automatically assigning, based on the one of the secondary cameras, new secondary cameras that view areas different from the one of the secondary cameras;
adding the new target sample to the target-sample set;
presenting the target samples of the target-sample set in the third window of the graphical user interface, wherein the target samples replace the portions of video of the candidate samples in the third window;
repeating the steps of searching, presenting, creating, updating, and adding until no candidate sample is selected for a period;
obtaining geographic locations of cameras used to acquire the target samples in the target sample set;
obtaining times of the target samples in the target sample set; and
reconstructing, using the times and the geographic locations, a track of the target, wherein the track graphically depicts a path of the target through the geographical locations at the obtained times.

* * * * *